United States Patent [19]
Terui et al.

[11] Patent Number: 4,477,169
[45] Date of Patent: Oct. 16, 1984

[54] AUTOMATIC FOCUSING CAMERA SYSTEM AND PHOTOGRAPHING LENS STRUCTURE THEREFOR

[75] Inventors: Nobuhiko Terui, Tokyo; Sakuji Watanabe, Warabi; Hiroshi Meguro, Kawasaki, all of Japan

[73] Assignee: Nippon Kogaku K.K., Tokyo, Japan

[21] Appl. No.: 396,724

[22] Filed: Jul. 9, 1982

[30] Foreign Application Priority Data

Jul. 14, 1981 [JP] Japan ............................ 56-109863

[51] Int. Cl.³ ............................................. G03B 7/08
[52] U.S. Cl. ................................. 354/409; 354/402
[58] Field of Search ............... 354/25 R, 25 A, 25 P, 354/25 N, 31, 31 F, 197, 198, 195, 128, 286, 400–409; 352/140, 142

[56] References Cited

U.S. PATENT DOCUMENTS

| | | | |
|---|---|---|---|
| 3,940,777 | 2/1976 | Komine | 352/140 |
| 4,032,934 | 6/1977 | Hendrickson et al. | 354/25 A |
| 4,189,219 | 2/1980 | Hasegawa et al. | 354/128 |
| 4,314,748 | 2/1982 | Kawabata et al. | 354/25 |
| 4,323,303 | 4/1982 | Enomoto | 352/140 |
| 4,359,276 | 11/1982 | Tomori | 354/25 X |

FOREIGN PATENT DOCUMENTS

| | | | |
|---|---|---|---|
| 3036019 | 3/1981 | Fed. Rep. of Germany | 354/25 |
| 0094335 | 7/1981 | Japan | 354/25 |

Primary Examiner—William B. Perkey
Attorney, Agent, or Firm—Shapiro and Shapiro

[57] ABSTRACT

A lens structure with an imaging optical system detachably mountable on a camera body having a focus detecting device capable of detecting the positional relationship between the image of an object formed by the imaging optical system and a predetermined plane and of producing a corresponding detection signal comprises means for adjusting the imaging optical system in response to the detection signal, terminal means to be electrically connected to the camera body upon mounting of the lens structure on the camera body and detecting means adapted to transmit, to the camera body, a first signal in a first state where the imaging optical system is focused to the object at infinite distance, or a second signal in a second state where the imaging optical system is focused to the object at a shortest distance, or a third signal in a third state other than said first or second state.

6 Claims, 3 Drawing Figures

AUTOMATIC FOCUSING CAMERA SYSTEM AND PHOTOGRAPHING LENS STRUCTURE THEREFOR

BACKGROUND OF THE INVENTION

1. Field of the Invention

The present invention relates to a camera system having automatic focusing function and an interchangeable lens structure therefor.

2. Description of the Prior Art

There are already proposed various automatic focusing cameras, one type employing a focusing system capable of maintaining even a moving object in focus by detecting whether the photographic lens is in focus, front-focused or back-focused and continuously moving the photographic lens through a lens drive mechanism in response to the detection system. The lens is called in focus, front-focused or back-focused respectively when it is focused to a principal object, or to a point closer or farther than said object to the camera. In such system, the lens drive mechanism, in response to a front-focus signal indicating that the lens is front-focused, shifts the lens toward an infinity position, which is an end position in the lens moving range and corresponds to a lens position focused to an object at infinite distance, or, in response to a back-focus signal indicating that the lens is back-focused, said lens drive mechanism shifts the lens in the opposite direction toward a shortest focus position, which is the other end position in said lens moving range and corresponds to a lens position focused to an object at a shortest focusable distance. However, if the front-focus signal continues even after the arrival of the photographic lens at said infinity position for example due to a failure in the focus detecting device, the lens drive mechanism tries to drive the lens further in response to said front-focus signal, thus eventually causing failure or damage in the lens drive mechanism or in the photographic lens itself. A similar situation may be encountered when the lens arrives at the shortest focus position in response to a back-focus signal. It is therefore desirable, in case the front-focus signal continues after the arrival of the lens at the infinity position or the back-focus signal continues after the arrival of the lens at the shortest focus position, to generate an alarm, or to forcedly terminate the drive for the lens, or to drive the lens in the opposite direction. For this purpose it becomes necessary to detect that the photographic lens is at the infinity position or at the shortest focus position and to transmit the corresponding detection signal from the lens structure to the camera.

Also in an interchangeable lens structure, it is generally desirable to minimize the number of terminals for signal transmission between the lens structure and the camera.

SUMMARY OF THE INVENTION

The principal object of the present invention is to provide an automatic focusing camera system and a photographing lens structure therefor, in which infinity signal and shortest distance signal, indicating that the lens is at the infinity focus position and at the shortest focus position, respectively, can be transmitted to the camera through a common terminal.

Another object of the present invention is to provide a camera system allowing reduction of the number of terminals for signal transmission for automatic focusing between the camera and the photographic lens structure.

DESCRIPTION OF THE PREFERRED EMBODIMENTS

Now the present invention will be clarified in detail by an embodiment thereof shown in the attached drawings.

Figure 1:
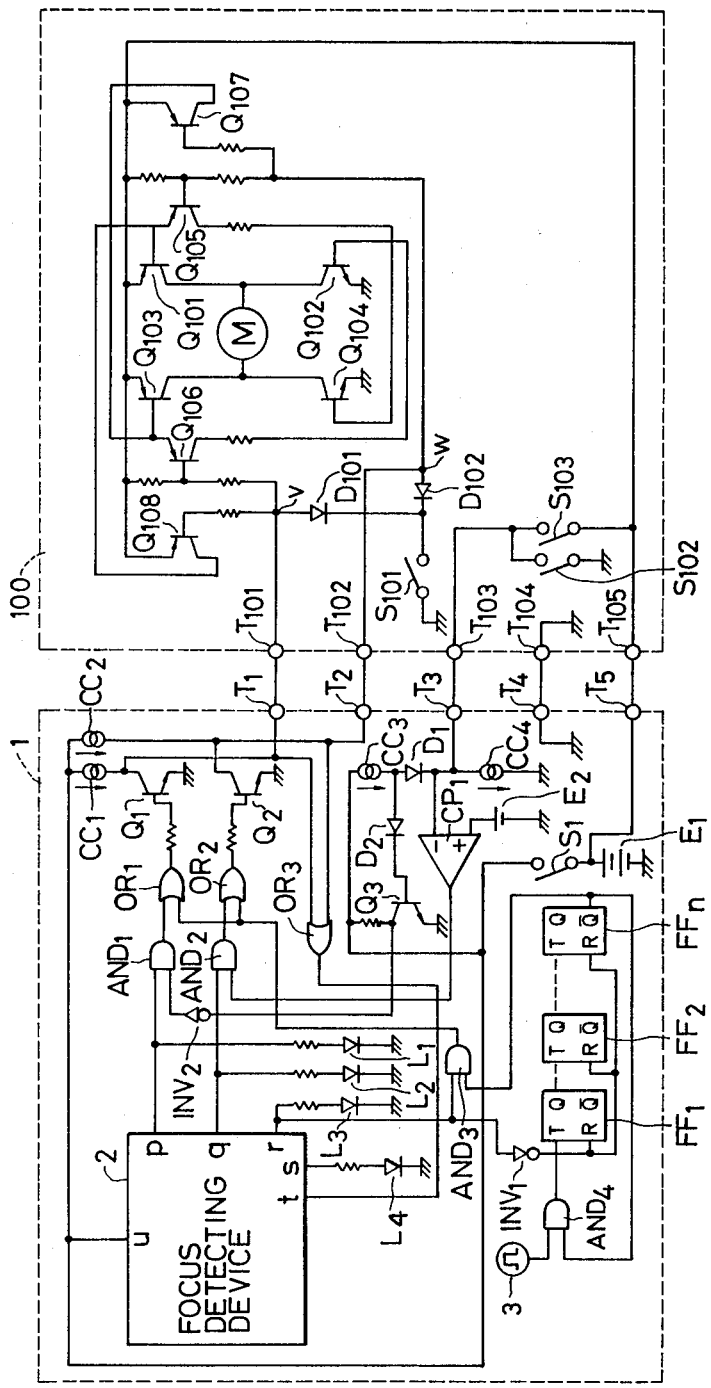
FIG. 1 is a circuit diagram showing an embodiment of the present invention.

In FIG. 1, a block 1 indicates the circuit in the camera, and another block 100 indicates the circuit provided in an interchangeable lens structure.

Figure 2:
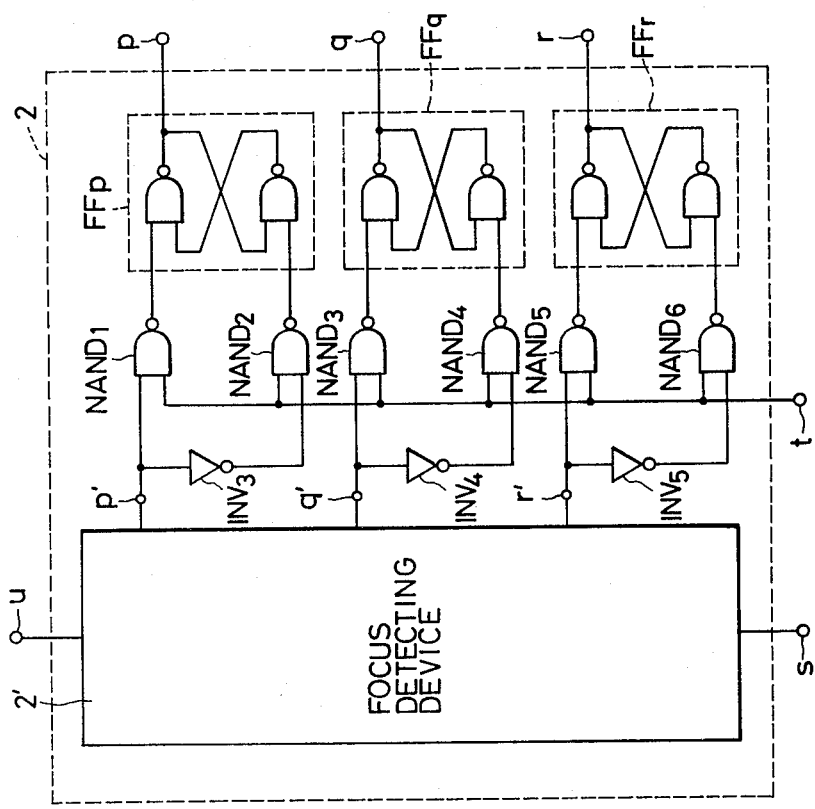
FIG. 2 is a circuit diagram of a focus detecting device.

The circuit 1 in the camera is provided with terminals T1, T2 for principally transmitting focus detection signals to the lens; a terminal T3 for receiving the infinity signal and the shortest distance signal from the lens; a grounded terminal T4 and a power supply terminal T5 connected to the positive terminal of a power supply E1 bypassing a power switch S1. A focus detecting device 2 is provided with an output terminal p for producing a front-focus signal, an output terminal q for producing a back-focus signal, an output terminal r for producing an in-focus signal, an output terminal s for producing a focus detection disabled signal, an input terminal t for receiving a focus locking signal, and a power supply terminal u, and comprises as shown in FIG. 2, a focus detecting unit 2' known already in the art and having output terminals p', q', r' and s respectively for producing the front-focus signal, back-focus signal, in-focus signal and focus detection disabled signal. Said output terminal p' assumes the high-level state in response to the detection of a front-focused state, and otherwise assumes the low-level state. Similarly the terminals q', r' and s assume the high-level state respectively in response to the back-focused state, in-focus state and focus detection disabled state, and otherwise assume the low-level state.

The output signals from said output terminals p', q' and r' are respectively supplied to input terminals of NAND gates NAND1, NAND3 and NAND5, and also supplied respectively through inverters INV3, INV4 and INV5 to NAND gates NAND2, NAND4 and NAND6. The terminal t is connected to the other input terminals of said NAND gates NAND1–NAND 6. The output signals from said NAND gates NAND1 and NAND2 are supplied to a flip-flop FFp. Similarly those from the NAND gates NAND3, NAND4 and from NAND5, NAND6 are respectively supplied to flip-flops FFq and FFr. The output signals from said flip-flops FFp, FFq, FFr are respectively supplied to the output terminals p, q and r. In response to a low-level signal received at the terminal t, the NAND gates NAND1–NAND6 provide high-level output signals, so that the flip-flops FFp, FFq, FFr maintain the same output signals as before the entry of the low-level signal to the terminal t regardless of the output signals from the terminals p', q', r', as long as said low-level signal to the terminal t is continued. A light-emitting diode L1 for indicating the front-focused state is lighted by the high-level front-focus signal from the terminal p. Similarly light-emitting diodes L2, L3 and L4 for indicating the back-focused state, in-focus state and focus detection disabled state are respectively lighted by a high-level back-focus signal from the terminal q, a high-level in-focus signal from the terminal r, and a high-level focus detection disabled signal from the terminal s. The light-emitting diodes may naturally be replaced by other visual display elements such as liquid-crystal display elements or acoustic display elements such as sound-generating elements. The front-focus signal from the terminal p turns on a transistor Q1 through an AND gate AND1 and an OR gate OR1. The back-focus signal from the terminal q turns on a transistor Q2 through an AND gate AND2 and an OR gate OR2. The in-focus signal from the terminal r turns on the transistors Q1, Q2 through an AND gate AND3 and the OR gates OR1, OR2. The in-focus signal is further supplied to a one-shot multivibrator composed of an inverter INV1, flip-flops FF1–FFn, clock generator 3 and an AND gate AND4. After a predetermined time from the start of the in-focus signal, the last flip-flop FFn generates a low-level output signal from output terminal $\bar{Q}$ to close the AND gate AND3. A constant-current source CC1 is connected between the junction point of the collector of the transistor Q1 and of the terminal T1 and a power switch S1, while another constant-current source CC2 is connected between the junction point of the collector of the transistor Q2 and of the terminal T2 and the power switch S1. An OR gate OR3 is connected through input terminals thereof to the terminals T1, T2 and through an output terminal to the focus locking input terminal t. Still another constant-current source CC3 is connected between the power switch S1 and anodes of diodes D1, D2, and the cathode of the diode D1 is connected to the terminal T3 and also to the ground through another constant-current source CC4. The diodes D1, D2 have approximately the same forward voltages. Also the current in the constant-current source CC4 is selected smaller than that in the constant-current source CC3. The cathode of the aforementioned diode D2 is connected to the base of a transistor Q3 for identifying the infinity signal and producing a low- or high-level signal respectively in the turned-on or turned-off state to an inverter INV2. A comparator CP1 for identifying the shortest distance signal is connected through the inverting input terminal (−) thereof to the terminal T3 and through the non-inverting input terminal (+) to a reference voltage source E2, the voltage of which is selected larger than the base-emitter voltage of the transistor Q3 but smaller than the voltage of the power supply source E1.

Figure 3:
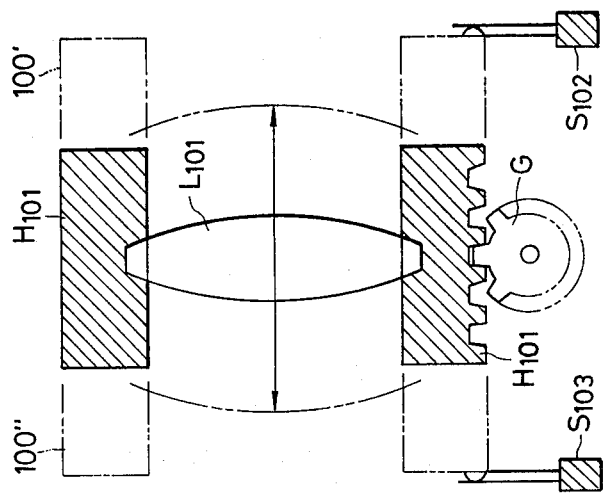
FIG. 3 is a schematic view showing a mechanism for actuating switches for generating the infinity signal and the shortest distance signal.

The circuit 100 in the lens structure is provided with terminals T101–T105 respectively corresponding to the terminals T1–T5 of the camera circuit. The terminals T101, T102 are respectively connected to input terminals v, w of a motor drive circuit which is composed of transistors Q101–Q104 connected to constitute a bridge, a motor M connected between neutral points of said bridge to drive the photographic lens in the axial direction thereof, and transistors Q105–Q108 for controlling the aforementioned transistors Q101–Q104. The motor drive circuit is further provided with a focus locking switch S101 which is grounded at a terminal thereof and is connected at the other terminal thereof to said input terminals v, w respectively through diodes D101, D102. The switch S101 is normally open but is closed in response to an external focus locking operation for inhibiting the lens drive regardless of the focus detection signal from the focus detecting device. A switch S102 for generating the infinity signal, connected between the terminal T103 and ground, is normally open but is closed when a focusing lens L101, of the photographic lens mounted on a focusing ring H101 as shown in FIG. 3, is brought to an infinity position 100′ together with the focusing ring H101 by the rotation of a gear G linked with the motor M. A switch S103 for generating the shortest distance signal, connected between the terminals T103 and T105, is normally open but is closed when the focusing lens L101 is brought to a shortest focus position 100″ together with the focusing ring H101 by the inverse rotation of the gear G.

In the following there will be explained the function of the circuit described above. Upon mounting of the lens structure on the camera, the terminals T101–T105 are respectively connected to the terminals T1–T5, whereby the circuit 100 of the lens structure is powered by the power supply source E1 through the terminals T5 and T105. Also the circuit 1 of the camera is powered by said source E1 when the power switch S1 in the camera is closed. It is now assumed that focus locking is not in effect, so the switch S101 is maintained open, and that the photographic lens is at an intermediate position between the infinity position, and the shortest distance position so the switches S102 and S103 are both maintained open. Because of the open state of the switches S102 and S103, the terminal T103 is disconnected from the circuit in the lens structure. The current from the constant-current source CC3, being larger than that from the constant-current source CC4, is partly supplied to the diode D2 to turn on the transistor Q3 for identifying the infinity signal, whereby the inverter INV2 generates a high-level signal to open the AND gate AND1. Also the input voltage to the inverting input terminal (−) of the comparator CP1 is made approximately equal to the base-emitter voltage of the transistor Q3 because of the conductive state thereof, so that said comparator CP1 provides a high-level output signal to open the AND gate AND2. In this manner, when the photographic lens is at an intermediate position between the infinity position and the shortest distance position, the transistor Q3 is rendered conductive and the comparator CP1 provides a high-level output signal to open the AND gates AND1 for transmitting the front focus signal and AND2 for transmitting the back focus signal. Also the last flip-flop FFn of the one-shot multivibrator normally provides a high-level output signal $\bar{Q}$ to open the AND gate AND3.

(1) Front-focused state:

In case the front-focused state is detected by the focus detecting device 2, a high-level front-focus signal is produced from the output terminal p thereof to activate the light-emitting diode L1 for indicating the front-focused state, and to turn on the transistor Q1 through the gates AND1 and OR1, thereby shifting the terminal T1 the low-level state. Other terminals q, r, s are at the low-level state to turn off the transistor Q2, whereby the terminal T2 assumes the high-level state. The low-level potential of said terminal T1 is transmitted through the terminals T101 and v to turn on the transistors Q106 and Q108, whereby the transistors Q102 and Q103 are rendered conductive. Also the high-level potential of the terminal T2 is transmitted through the terminals T102 and w to turn off the transistors Q105 and Q107, whereby the transistors Q101 and Q104 are rendered non-conductive. Consequently a current is generated through the transistor Q103, motor M and transistor Q102 to rotate the motor M in the forward direction, thereby displacing the focusing lens L101 toward the infinity position 100'. The motor M is immediately stopped as will be explained later upon arrival of the photographic lens at the in-focus position.

The motor drive circuit or the drive mechanism for the focusing lens L101 may be damaged if the front-focus signal still continues even after the focusing lens L101 reaches the infinity position 100' and becomes no longer movable. In order to prevent such situation, upon arrival of the focusing lens L101 at the infinity position 100', the switch S102 is closed to produce a low-level infinity signal to the terminal T3, in response to which the transistor Q3 for identifying the infinity signal is turned off to shift the output signal from the inverter INV2 to the low-level state, thereby closing the AND gate AND1 for transmitting the front-focus signal. Consequently the transistor Q1 is turned off to shift the terminal T1 to the high-level state, thereby turning off the transistors Q106, Q108, Q102 and Q103 and interrupting the current to the motor M. In this manner, upon arrival of the focusing lens L101 at the infinity position, the switch S102 is closed to generate the infinity signal, thereby terminating the power supply to the motor M and inhibiting further displacement of the photographic lens.

(2) Back-focused state:

In case the back-focused state is detected, a high-level back-focus signal is supplied from the terminal q to activate the light-emitting diode L2 for indicating the back-focused state and to turn on the transistor Q2 through the gates AND2 and OR2, thereby shifting the terminal T2 to the low-level state. In such situation the terminal T1 is at the high-level state. The low-level potential of the terminal T2 turns on the transistors Q105 and Q107, thereby rendering the transistors Q101 and Q104 conductive. Also the transistors Q106, Q108, Q102 and Q103 are all maintained non-conductive by the high-level potential of the terminal T1. Consequently a current is generated through the transistor Q101, motor M and transistor Q104 to drive the motor M in the reverse direction, thereby displacing the focusing lens L101 in the opposite direction toward the shortest distance position 100''. The motor M is immediately stopped upon arrival of the focusing lens L101 at the in-focus position.

In order to prevent the continued reverse rotation of the motor M after the arrival of the focusing lens L101 at the shortest distance position prohibiting further lens displacement, the switch S103 is closed to produce a high-level shortest focus signal, which is equal to the positive potential of the power supply source E1, to the terminal T3. In response to the shortest focus signal, the comparator CP1 inverts the output signal to the low-level to close the gate AND2 thereby shifting the terminal T2 to the high-level potential. Consequently the transistors Q105, Q107, Q101 and Q104 are turned off to terminate the power supply to the motor M.

(3) In-focus state:

When the focusing lens L101 is brought to the in-focus position by the displacement thereof in response to the aforementioned front-focus or back-focus signal, a high-level in-focus signal is generated from the terminal r to activate the light-emitting diode L3 for indicating the in-focus state and to turn on the transistors Q1 and Q2 through the gates AND3, OR1 and OR2, thereby shifting the terminals T1, T2 to the low-level state. The low-level potential at the terminal T1 turns on the transistors Q106 and Q108, while the low-level potential at said terminal T2 turns on the transistors Q105 and Q107. The transistor Q108 in conductive state forcedly turns off the transistor Q101 despite the fact that the transistor Q105 is in the conductive state, and supplies an emitter current to the transistor Q105. Similarly the transistor Q107 in the conductive state forcedly turns off the transistor Q103 despite the conductive state of the transistor Q106, and supplies an emitter current to the transistor Q106. The transistors Q105 and Q106 in conductive state respectively turn on the transistors Q104 and Q102, thereby short-circuiting the motor M, thereby rapidly interrupting the motor rotation and stopping the focusing lens at the in-focus position. Also at this moment the gate OR3 provides a low-level signal because of the low-level potentials at the terminals T1 and T2, thereby achieving the focus locking operation in the same manner as achieved by the closure of the switch S101. After a predetermined time from the start of the in-focus signal, the one-shot multivibrator inverts the output signal from the output terminal $\overline{Q}$ from the final flip-flop FFn to the low-level state, thereby closing the gate AND3. Consequently the transistors Q1 and Q2 are turned off, the focus locking state is resolved, and all the transistors Q101–Q108 of the motor drive circuit are turned off. The above-mentioned predetermined time is selected at least longer than the time required for the complete stopping of the motor M after the formation of aforementioned short-circuit.

(4) Focus detection disabled state:

In case the focus detection is disabled, for example for certain objects, a high-level focus detection disabled signal is produced from the terminal s to activate the light-emitting diode L4 for indicating the focus detection disabled state. In this state the output terminals p, q and r are at the low-level state to maintain the terminals T1, T2 at the high-level, whereby the transistors Q101–Q108 of the motor drive circuit are turned off to prohibit power supply to the motor M. Instead of using the low-level state of the terminals p, q and r, the terminal s may be connected through an inverter to the input terminals of the gates AND1, AND2 and AND3.

(5) Focus locking state:

When the switch S101 is closed by the focus locking operation, the terminals v and w are shifted to the low-level potential through the diodes D101, D102 whereby the transistors Q102 and Q104 are turned on in the same manner as in the in-focus state, thereby rapidly interrupting the motor rotation and stopping the focusing lens L101 at a position of the focus locking operation. Also the above-mentioned low-level potential is transmitted, as the focus locking signal, through the terminals T101, T102 and the gate OR3 to the focus locking input terminal t, thereby latching the output signals from the terminals p, q, r and s and fixing the contents of the display units L1–L4.

In the present embodiment, the circuit 100 of the lens structure, being directly connected to the power supply source without going through the power switch S1, is immediately powered when the lens structure is mounted on the camera. Such structure is advantageous for avoiding the damage of the power switch S1 which will be caused by the large current required in the motor drive circuit in the lens structure if the current is supplied through the switch S1. The transistors Q101–Q108 in the motor drive circuit remain turned off as long as the power switch S1 is open. Switches S103, S102 are open when the lens is in an intermediate position between the infinity position and the shortest distance position, so the terminal T3 is disconnected from the lens circuit. Thus power consumption is minimized.

The present invention is by no means limited to the foregoing embodiment but is subject to various modifications. For example, the infinity signal and the shortest focus signal in the foregoing embodiment are utilized for prohibiting the transmission of the front-focus signal and the back-focus signal to the motor drive circuit, but it is also possible to utilize said infinity signal and shortest focus signal for giving an alarm indicating that the lens is at the infinity or shortest distance position or for reversing the motor M, instead of or in addition to the aforementioned function.

We claim:

1. A camera having a lens structure with an imaging optical system and a camera body capable of accepting said lens structure and provided with focus detecting means for generating detection signals in response to the positional relationship between the image of an object formed by said imaging optical system and a predetermined plane and for displaying said positional relationship on a display, wherein said lens structure comprises means for adjusting said imaging optical system in response to said detection signals and first and second terminals for transmitting said detection signals to said adjusting means when said lens structure is mounted on said camera body, comprising:

control means provided on said lens structure and adapted to produce a control signal;

stopping means provided on said lens structure to terminate operation of said adjusting means in response to said control signal and to simultaneously transmit stop signals through said first and second terminals to said camera body; and means provided on said camera body for latching said display in response to the stop signals transmitted through said first and second terminals.

2. A camera according to claim 1, wherein said camera body comprises a power source for said focus detecting device and for said adjusting means, and said lens structure comprises third and fourth terminals to be connected to said power source for power supply to said adjusting means when said lens structure is mounted on said camera body.

3. In a camera having a camera body, a lens structure adapted to be attached to the camera body, said lens structure comprising an imaging optical system, said camera body having a focus detecting device that produces a front focus signal when said optical system is front focused relative to a predetermined plane and a back focus signal when said optical system is back focused relative to said plane, first gate means for producing an output in response to said front focus signal, second gate means for producing an output in response to said back focus signal, an input terminal, and control means for controlling said first and second gate means dependent upon the potential of said input terminal, said lens structure further comprising:

(a) means for adjusting the imaging optical system to focus the same in response to one of said outputs;

(b) means for applying a first potential to said input terminal and for causing said control means to close said first gate means and prevent its output when said imaging optical system is in a first state focused to an object located at an infinite distance; and (c) means for applying a second potential to said input terminal and for causing said control means to close said second gate means and prevent its output when said imaging optical system is in a second state focused to an object located at a shortest distance; said camera having means for applying a third potential to said input terminal when said imaging optical system is in a state other than said first and second states and for causing said first and second gate means to produce their outputs in response to said front focus and back focus signals, respectively.

4. A lens structure according to claim 3, wherein said means for applying said first potential to said input terminal comprises first switch means closeable for connecting said input terminal to ground potential and wherein said means for applying said second potential to said input terminal comprises second switch means closeable for connecting said input terminal to a source of potential having a predetermined value relative to ground potential, said third potential being applied to said input terminal when said first and second switch means are open.

5. A lens structure according to claim 3, wherein said lens structure has terminals that are engaged with corresponding terminals on said camera body when said lens structure is attached to said camera body, one of said terminals of said lens structure engaging said input terminal and having said first potential or said second potential applied thereto when said imaging optical system is in said first state or said second state, respectively, further terminals of said lens structure transmitting said outputs, respectively, from said camera body to said lens structure, and additional terminals of said lens structure supplying operating power from said camera body to said lens structure.

6. In a camera comprising a lens structure having an imaging optical system, a camera body upon which the lens structure is adapted to be mounted and having a focus detecting device that generates a front focus signal when the image of an object formed by the imaging optical system is at one side of a predetermined plane and that generates a back focus signal when the image is at the opposite side of said predetermined plane, said lens structure having control means for adjusting the imaging optical system to focus the same in response to one of said front and back focus signals, the improvement comprising:

(a) terminal means for electrically connecting the lens structure and the camera body when the lens structure is mounted on the camera body, said terminal means including an input terminal pair consisting of a single terminal on the camera body and corresponding single terminal on the lens structure;

(b) state responsive means on the lens structure for sending through said input terminal pair to said camera body a first potential when the imaging optical system is in a first state focused to an infinite distance object and a second potential when the imaging optical system is in a second state focused to a shortest distance object;

(c) detecting means on the camera body for detecting said first and second potentials;

(d) first transmitting means for transmitting said front focus signal to said control means;

(e) second transmitting means for transmitting said back focus signal to said control means;

(f) means responsive to detection of said first potential by said detecting means for preventing the first transmitting means from transmitting said front focus signal to said control means;

(g) means responsive to detection of said second potential by said detecting means for preventing the second transmitting means from transmitting said back focus signal to said control means; and (h) means for applying to said input terminal pair a third potential when said imaging optical system is in a third state, whereby said first and second transmitting means are permitted to transmit said front focus signal and said back focus signal, respectively, to said control means.

* * * * *